March 6, 1934.  C. F. SHULTZ  1,949,494
BRUSH MAKING MACHINE
Filed April 26, 1933   3 Sheets-Sheet 1
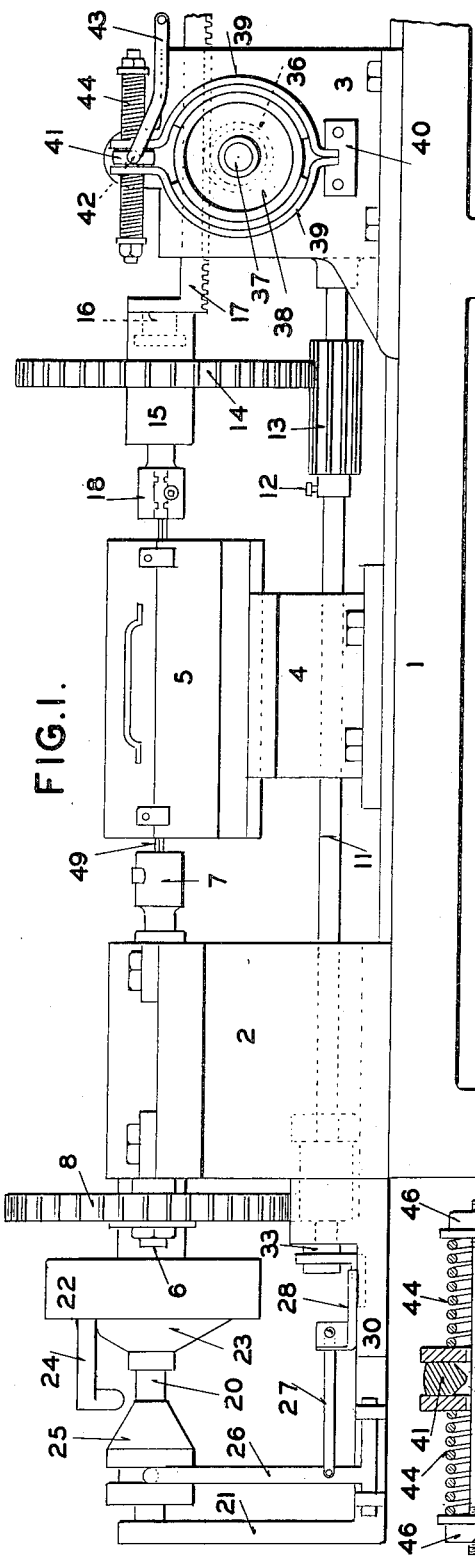
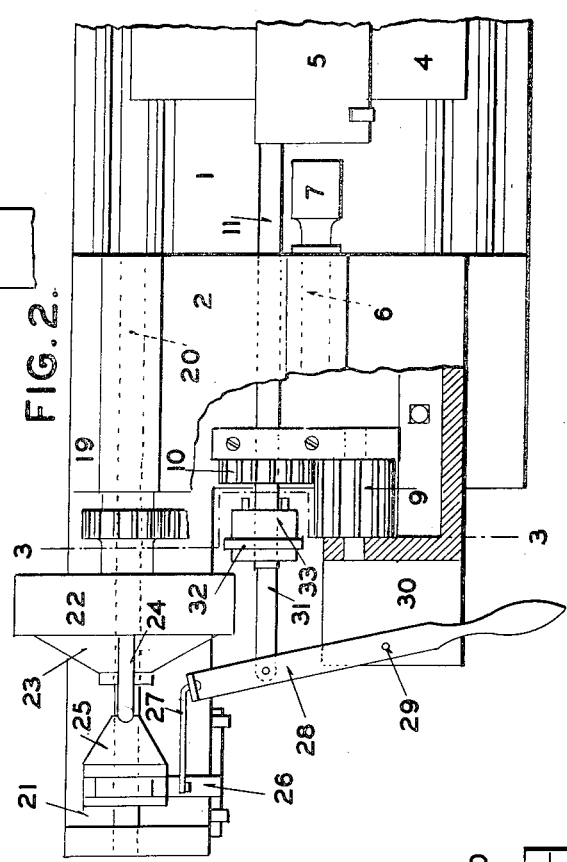
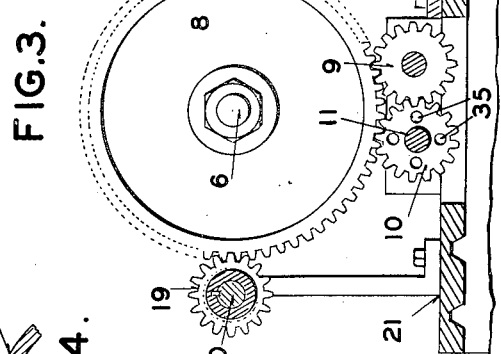
Inventor
C. F. Shultz
By L. E. Huffman
Att'y.

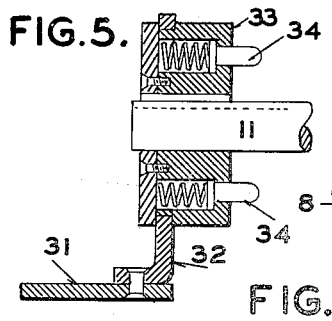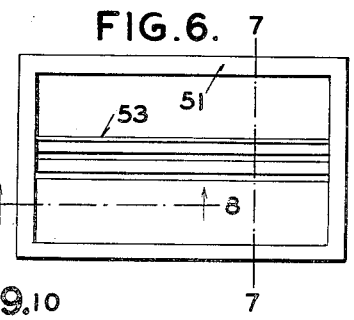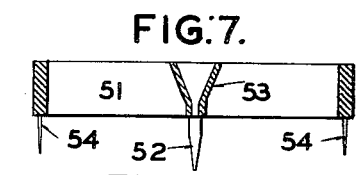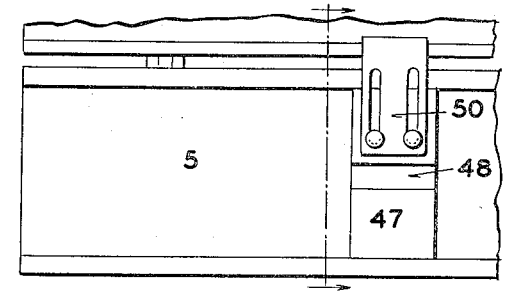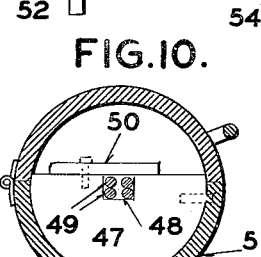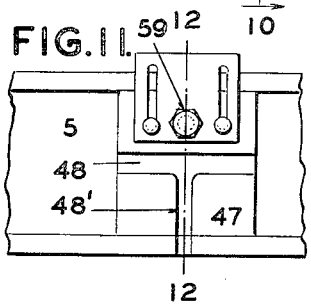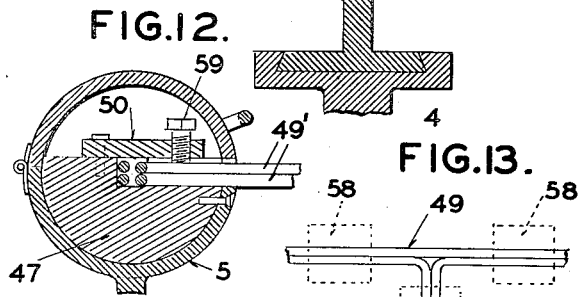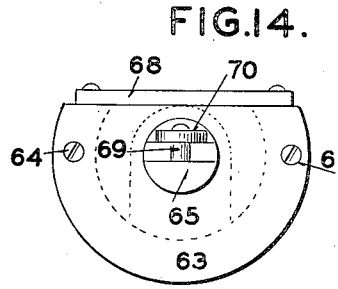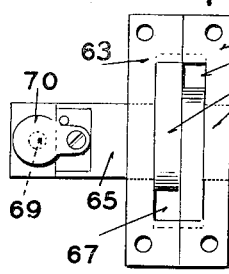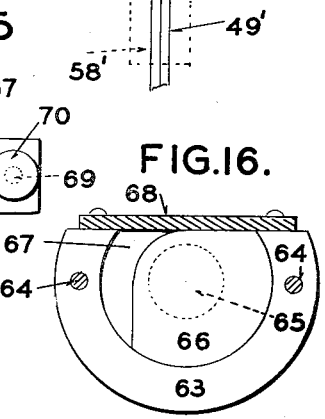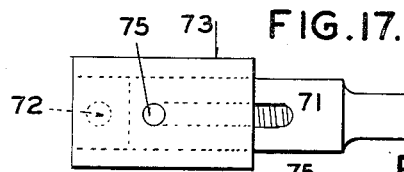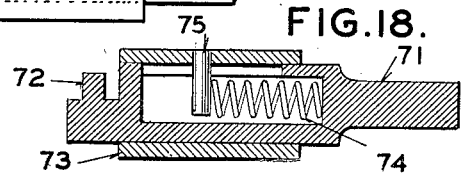

March 6, 1934.　　　C. F. SHULTZ　　　1,949,494
BRUSH MAKING MACHINE
Filed April 26, 1933　　　3 Sheets-Sheet 3
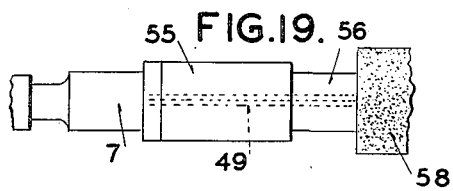
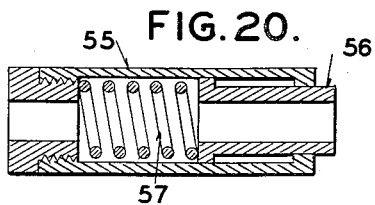
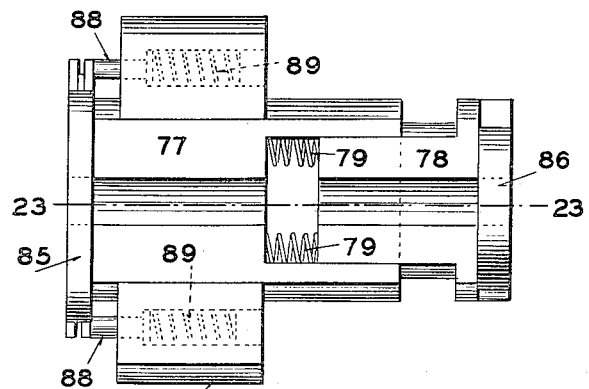
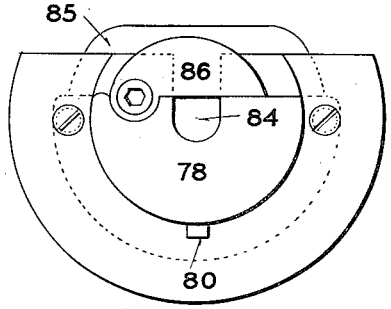
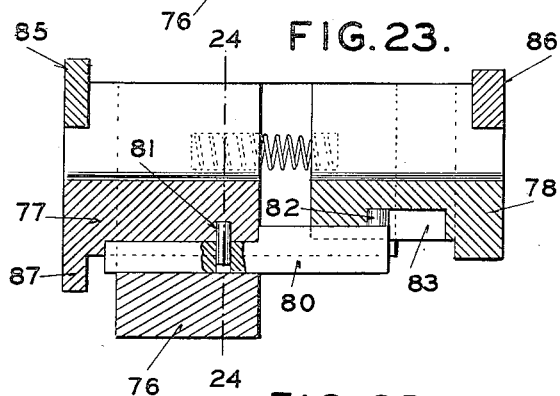
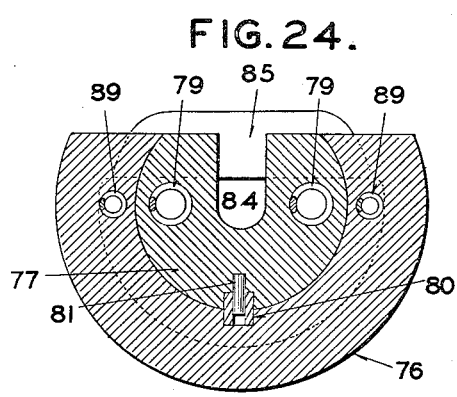
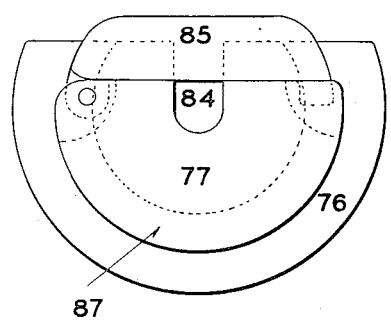
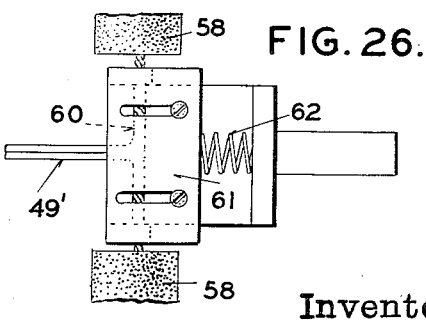
Inventor
C. F. Shultz
By *[signature]*
Att'y.

Patented Mar. 6, 1934

1,949,494

UNITED STATES PATENT OFFICE 1,949,494

BRUSH MAKING MACHINE

Chauncey F. Shultz, St. Louis, Mo.

Application April 26, 1933, Serial No. 667,945

19 Claims. (Cl. 300—2)

My invention relates to a brush making machine and particularly to improvements in the type of machine shown and described in Patent No. 1,780,278 granted to me on November 4, 1930.

One object of my invention is to so construct the machine that two brush elements may be formed simultaneously. Such brush elements may form parts of a single brush or may be separate brushes. My invention, therefore, includes the necessary holding and supporting devices for the core wires of various types of brush.

Another object of my invention is to insure uniform tension on the core wires during the twisting operation.

Still another object of my invention is to provide improved means for inserting the cross or filler wires between the strands of the core wires.

A further object of my invention is to provide means for preventing the longitudinal spreading of the cross wires, which means will yield to compensate for the shortening of the wires during the twisting operation.

In the accompanying drawings, which illustrate a machine made in accordance with my invention, Figure 1 is a side elevation; Figure 2 is a top plan view of the head end of the machine, the head stock being partly broken away; Figure 3 is a section taken on the line 3—3 of Figure 2; Figure 4 is a sectional detail view of the tension brake; Figure 5 is a sectional detail view of a part of the clutch mechanism; Figure 6 is a top plan view of the filling guide; Figure 7 is a section taken on the line 7—7 of Figure 6; Figure 8 is a slightly enlarged section taken on the line 8—8 of Figure 6; Figure 9 is a top plan view of the twisting guide showing a form of separation for a two-part brush; Figure 10 is section taken on the line 10—10 of Figure 9; Figure 11 is a view similar to Figure 9 but showing a separator for a three-part brush; Figure 12 is a section taken on the line 12—12 of Figure 11; Figure 13 is a semi-diagrammatic view showing a three-part brush; Figure 14 is an end view of a separator for two independent brushes; Figure 15 is a top plan view of the separator shown in Figure 14, the top plate being removed; Figure 16 is a cross section of the separator shown in Figures 14 and 15; Figures 17 and 18 are a plan view and section, respectively, of a head or tail stock chuck for brushes having loop handles; Figure 19 is a plan view of a yielding filler support; Figure 20 is a longitudinal section of the support shown in Figure 19; Figure 21 is a top plan view of a separator including yielding filler supporting means; Figure 22 is a rear end view of the separator shown in Figure 21; Figure 23 is a section taken on the line 23—23 of Figure 21; Figure 24 is a section taken on the line 24—24 of Figure 23; Figure 25 is a front end view of the separator shown in Figure 21; and Figure 26 is a top view of a tail chuck for a three-part brush.

The bed plate 1 of the machine has mounted upon it, a head stock 2, a tail stock 3, and a support 4 upon which is slidingly mounted a cylindrical guide 5 of the kind described in my prior patent above referred to. Mounted in the head stock is a head spindle 6 having on its inner end a removable wire clamping chuck 7 and on its outer end a driving gear wheel 8. Meshing with gear wheel 8 is an elongated pinion 9 which meshes with a pinion 10 loosely mounted on shaft 11, the pinion 10 being out of alignment with the wheel 8. Shaft 11 extends to the rear end of the machine and is journaled in the tail stock. It has mounted on it by any suitable means, such as a set-screw 12, an elongated pinion 13. The pinion 13 meshes with a gear wheel 14 mounted on the tail spindle 15. This spindle rotates freely on a stud 16 carried by a rack bar 17 sliding in the tail stock. A wire clamping chuck 18, similar to the chuck 7, is removably carried in the tail spindle.

Gear wheel 8 meshes with a pinion 19 keyed or otherwise non-rotatably secured to a short shaft 20 journaled at one end in the head stock and at the other, in a bracket 21 carried thereby. Loosely mounted on the shaft 20 is a driving pulley 22 forming the outer member of a clutch, the inner member 23 of which is rigidly secured to the shaft. The clutch mechanism is controlled by an arm 24 actuated by a conical block 25 slidingly mounted on the shaft 20. The block is shifted along the shaft by means of a yoke 26. The yoke is connected by link 27 with a hand-lever 28 pivoted at 29 to a bracket 30 on the head stock. Lever 28 is also connected by a link 31 with a yoke 32 for actuating a clutch member 33 (shown in detail in Figure 5) keyed to the shaft 11 so as to slide longitudinally thereon but to be incapable of relative rotary movement. The clutch member 33 is provided with a pair of spring pins 34 adapted to engage with holes 35, preferably four in number, in the pinion 10 (Figure 3). When the forward end of the lever 28 is moved to its right-hand position, as shown in the drawings, both the head and tail spindles are disconnected from the drive so that they may be independently rotated in either direction. When the lever is moved toward its left-hand position, the clutch member 33 is shifted along the shaft 11 to bring the ends of the pins 34 into contact with the face of the pinion 10, after which the pins are telescoped in the clutch member. The conical block 25 is at the same time shifted along the shaft 20 to actuate the arm 24 and so connect clutch members 22 and 23. The pinion 19 will now be driven from the pulley through shaft 20. This will rotate the head spindle 6. This rotary movement is reversed and communicated to pinion 10 by the intermediate pinion 9. As soon as two of the holes 35 come into register with the pins 34, which will occur within the first quarter revolution, the pins will enter the holes, locking the shaft 11 to the wheel so that thereafter the tail spindle will be rotated in the opposite direction to the head spindle. It will be understood that the gearing is so proportioned that the speed of rotation of the head and tail spindles will be the same.

As was described in my prior patent, the tail spindle is drawn toward the head spindle during the operation of the machine by the shortening of the core wires resultant from twisting, the tension on the wires being regulated by retarding means applied to the rack carrying the tail chuck. In my prior patent this retardation was accomplished by means of a band brake to which pressure was applied manually. With this construction it has been found difficult to secure uniform tension on the core wires. The present retarding device is designed to overcome this difficulty. The rack 17 meshes with a pinion 36 on a shaft 37 journaled in the tail stock and carrying a brake drum 38. Cooperating with the brake drum are two brake shoes 39 having their lower ends set into a slot in a block 40 to provide a fulcrum for the shoes. Between the upper ends of the shoes is a cam 41 pivoted to the tail stock at 42 and provided with a lever 43 for moving the cam to separate the upper ends of the shoes and thus move the shoes out of engagement with the drum. The shoes are normally held in contact with the drum by a pair of coil springs 44 surrounding a rod 45 and bearings on the ends of the shoes. The tension of springs 44 is regulated by means of adjusting nuts 46. By means of this construction a constant and uniform retarding pressure is applied to the drum at all times except when it is released by depressing the lever 43. In this way, more uniform tension on the core wires is secured than is possible when manual application of pressure is depended upon. This results, particularly when combined with other features of my invention, in the production of more uniform brushes than has heretofore been practicable.

The cylindrical guide 5 for the ends of the radial wires, is similar to that described in my prior patent but is provided with a separator for the two brush elements to be simultaneously twisted. One form of such separator adapted for use when the two brush elements are twisted on a continuous core, is shown in Figures 9 and 10. In this construction the guide is provided, intermediate its length, with a partition formed of a semi-cylindrical block 47 provided with an open top passage 48 to receive the core wires 49. This passage 48 forms a central support for the core wires while the filler wires are being inserted and is of sufficient size to permit the twisting of the core wires within it during the brush twisting operation. The top of the passage 48 is adapted to be covered after the core wires are inserted by a sliding plate 50.

To assist in placing the filler wires between the strands of the core wires, I employ a filling guide such as shown in Figures 6, 7 and 8. This guide comprises a rectangular frame 51 of a width about equal to the diameter of the guide 5, and of a length somewhat more than the desired brush element to compensate for the shortening of the brush element during twisting of the core. The core wires are separated by wedges 52 on the lower sides of the end bars of the frame. Extending between these wedges is a guide trough 53 through which the filler wires are inserted. In case four core wires are used, the core is turned 90 degrees after the first set of filler wires is positioned and a second set of fillers inserted at right angles to the first set. When the second set of filler wires is inserted, the first set is prevented from lateral movement by being engaged near their ends by two rows of pins 54 carried on the under edges of the side rails of the frame. By the use of this guide, not only is the operation of inserting the filler wires greatly facilitated, but by using a measured quantity of wire for each filling operation, a more uniform brush is insured.

To prevent spreading of the filler wires, during the first part of the twisting operation and before the filler wires have been firmly gripped by the core wires, I have found it desirable to provide an end support for the filler wires. One form of such support is shown in Figures 19 and 20. This support consists of an outer tube 55, an inner tube 56, and an interposed spring 57. In using this support it is placed over the core wires, one end bearing against the end of the brush element 58 and the other against a fixed support, as for example, the head chuck 7. As the core wires are shortened by twisting, the two tubes are telescoped against the pressure of the spring, as shown in Figure 20, to compensate for this shortening.

In Figures 11 and 12 I have shown a form of separator adapted for use in forming a three-element flue brush. In forming such a brush, only two wires 49, extending from the head chuck 7 to the tail chuck 18, are used, the other two being replaced by two pairs of L-shaped wires 49'. Upon the parts of the L-shaped wires projecting at right angles, the third brush element 58' is formed. This form of separator, in place of being provided with only the longitudinal passage 48, has a T-shaped passage comprising such longitudinal passage and a branch 48' to receive the laterally projecting branches of the wires 49'. To prevent these branch wires from being drawn inwardly by the tension placed thereon in the twisting operation, they are firmly held in the branch passage by a clamping screw 59. After the two aligning brush elements 58 are formed, the third element 58' is formed on the laterally projecting branches of the wires 49'. During the latter twisting operation, no separator will be used in the guide 5 and a special form of chuck will replace the tail chuck 18. This special chuck, shown in Figure 26, is provided with a T-shaped passage 60 to receive the core wires, the wires being held in the passage by a sliding plate 61 normally held in position over the passage by a spring 62. As the previously formed brushes 58 would interfere with the rotation of the tail chuck, the tail spindle is thrown out of operation by loosening the set-screw 12 so that the shaft 11 may rotate freely in the pinion 13.

In Figures 14, 15 and 16 I have shown a form of separator for use in forming two independent brushes instead of two elements of a single brush, as in the forms of separator heretofore described. In this form the separator 47 is replaced by a separator formed of two approximately semi-cylindrical blocks 63 secured together by screws 64. Mounted in each of these blocks is a spindle 65 having on its inner end a stop 66 positioned in a recess 67 in the block and limited to a movement of 90 degrees by contact with a top plate 68. On the outer end of each spindle is a pin 69 around which the core wires are adapted to be looped. Pivoted plates 70 hold the core wire loops in position. This form of separator not only permits the attachment of the core wires of two separate brushes, but permits the independent turning of the core wires through an angle of 90 degrees, which I have found to be of advantage when independent brushes are formed.

In Figures 17 and 18 I have shown a form of chuck to replace the clamping chucks 7 or 18 when it is desired to form a brush with a loop on the end of the handle. It comprises a hollow spindle 71 having on its outer end a pin 72 to receive the loop and a sliding sleeve 73 normally held in position to cover the pin by a spring 74. This spring bears at one end on the spindle and at the other end on a pin 75 carried by the sleeve.

In Figures 21 to 25 I have shown a form of attachment for the guide 5 which incorporates the features of both a separator and a yielding end support and positioner for the filler wires. This attachment, which is particularly adapted for forming long brushes, comprises a main or outer semi-cylindrical block 76, replacing the separator 47, and an inner block having sliding engagement therewith. The inner block comprises two parts 77 and 78, telescoping with each other and normally held in extended position by coiled spring 79. Part 77 is prevented from rotation in the block 76 by a key 80 which also prevents relative rotation of the parts 77 and 78. Longitudinal movement of the key relative to the part 77, is prevented by a pin 81. The key is also provided with a pin 82 moving in a slot 83 in the part 78 to limit the telescopic movement of said part relative to part 77. Formed in the parts 77 and 78 is a passage 84 for the reception of the core wires. The core wires are retained in position at one end of the separator by a gate 85 pivoted to the part 77 and at the other end by a gate 86 pivoted to the part 78. On the inner end of the part 77 is a flange 87 adapted to contact with pins 88 carried in the block 76 and normally projecting a short distance beyond the end of the block under the tension of coil springs 89. In using this form of attachment, when the filler for the brush element at the left-hand end of the separator is inserted, the flange 87 is forced against the end of the block 76 so that when the filler guide is withdrawn the flange will be moved by the pins 88, under tension of springs 89, to compensate for the thickness of the adjacent wedge 52. In like manner when filling the brush element at the right-hand end of the separator, the part 78 is telescoped into the part 77 a sufficient distance to compensate for the thickness of the filler guide. As the brush elements are twisted, the two parts 77 and 78 telescope together to compensate for the shortening of that portion of the core wires between the elements and the inner block, comprising both parts, slides toward the left-hand end of the machine in the block 76 to compensate for the shortening of the core wires as a whole.

Having fully described my invention, what I claim as new and desire to secure by Letters Patent of the United States is:

1. In a device of the class described, the combination with a head and a tail spindle, of means for driving said spindles in opposite directions, and a hollow guide between said spindles for engaging the ends of brush fillers, said guide being divided into a plurality of compartments, whereby a plurality of brushes may be simultaneously formed between the spindles.

2. In a device of the class described, the combination with a head and a tail spindle, of means for driving said spindles including a clutch mechanism for each spindle, a hollow guide between said spindles for engaging the ends of brush fillers, said guide being divided into a plurality of compartments, and means for releasing both clutches to permit the free rotation of each spindle in either direction.

3. In a device of the class described, the combination with a head and a tail spindle, of means for driving said spindles including a clutch mechanism for each spindle, one of said clutch mechanisms including a member having a yielding detent having positive locking engagement with another element, a hollow guide between said spindles for engaging the ends of brush fillers, said guide being divided into a plurality of compartments, and means for releasing both clutches to permit the free rotation of each spindle in either direction.

4. In a device of the class described, the combination with core twisting means including head and tail spindles between which core wires may be twisted, of retarding means operating on the tail spindle to apply tension to the core wires, said retarding means including a friction brake, means normally tending to move said brake to operative position, and manually-operated means for releasing the brake.

5. In a device of the class described, the combination with core twisting means including head and tail spindles between which core wires may be twisted, of retarding means operating on the tail spindle to apply tension to the core wires, said retarding means including a friction brake, adjustable spring-actuated means tending to move said brake to operative position, and manually-operated means for releasing the brake.

6. In a device of the class described, the combination with core twisting means, of a hollow guide for engaging the ends of the fillers of brushes twisted by said means, and a partition in said guide, said partition being provided with a core wire passage of sufficient size to permit the twisting of the core wires therein.

7. In a device of the class described, the combination with core twisting means, of a hollow guide for engaging the ends of the fillers of brushes twisted by said means, a partition in said guide, said partition being provided with a main core wire passage and an auxiliary passage for lateral core wires, and means for clamping said lateral core wires.

8. In a device of the class described, the combination with core twisting means, of a hollow guide for engaging the ends of the fillers of brushes twisted by said means, a partition in said guide, a spindle carried by said partition, and loop engaging means on said spindle.

9. In a device of the class described, the combination with core twisting means, of a hollow guide for engaging the ends of the fillers of brushes twisted by said means, a partition in said guide, a pair of spindles carried by said partition, said spindles having limited independent rotary movement relative to the partition, and loop engaging means on each of said spindles.

10. In a device of the class described, the combination with core twisting means comprising a rotary spindle, a chuck for said spindle having a loop engaging member, and a part movable into position to retain the loop upon said member.

11. In a device of the class described, the combination with core twisting means, of a support surrounding the core, said support comprising two telescoping parts and an interposed spring, one end of said support engaging the filler in the core to yieldingly hold the same in position.

12. In a device of the class described, the combination with core twisting means, of a hollow guide for engaging the ends of the fillers of brushes twisted by said means, and a partition in said guide having a passage for core wires therein, said partition including two parts relatively movable to compensate for the shortening of the portion of the core wire in said passage.

13. In a device of the class described, the combination with core twisting means, of a hollow guide for engaging the ends of the fillers of brushes twisted by said means, a partition block carried in said guide, a member sliding in said block and provided with a core wire passage, and yielding means positioning said member relative to said block.

14. In a device of the class described, the combination with core twisting means, of a hollow guide for engaging the ends of the fillers of brushes twisted by said means, a partition block carried in said guide, a member sliding in said block, and a second member having movement relative to said first named member, each of said members being provided with a core wire passage.

15. In a device of the class described, the combination with core twisting means, of a hollow guide for engaging the ends of the fillers of brushes twisted by said means, a partition block in said guide, a member sliding in said block and provided with a core wire passage, yielding means positioning said member relative to said block, and a second member also provided with a core wire passage and supported to yield with relation to said first named member.

16. In a device of the class described, the combination with core twisting means, of a hollow guide for engaging the ends of the fillers of brushes twisted by said means, a partition block carried in said guide, a member sliding in said block and provided with a core wire passage, a spring-actuated part for positioning the member relative to the block, a second member slidingly carried by said first named member, and spring means biasing said members toward extended position.

17. A filling guide for brush making machines, comprising a guide trough, and a pair of core wire separators positioned adjacent the ends of said trough.

18. A filling guide for brush making machines, comprising a guide trough, a pair of core wire separators positioned adjacent the ends of said trough, and means for preventing shifting of pre-inserted fillers.

19. A filler guide for brush making machines, comprising a frame having a guide trough, a pair of core wire separators, and pins for engaging with pre-inserted fillers.

CHAUNCEY F. SHULTZ.